United States Patent
Yang

[11] Patent Number: 5,549,524
[45] Date of Patent: Aug. 27, 1996

[54] MULTIPLE FUNCTIONED COMBINED POWER SYSTEM

[76] Inventor: Tai-Her Yang, No. 32 Lane 29, Taipin St., Si-Hu Town, Dzan-Hwa, Taiwan

[21] Appl. No.: 317,587
[22] Filed: Oct. 3, 1994
[51] Int. Cl.$^6$ .................................................. B60K 41/06
[52] U.S. Cl. ............................................................ 477/3
[58] Field of Search ......................................... 477/3

[56] References Cited

U.S. PATENT DOCUMENTS

| | | | |
|---|---|---|---|
| 2,564,393 | 8/1951 | Clancy | 477/3 |
| 2,571,284 | 10/1951 | Nims | 477/3 |
| 3,566,717 | 3/1971 | Berman et al. | 477/3 |
| 5,285,111 | 2/1994 | Sherman | 477/3 |

*Primary Examiner*—Dirk Wright
*Attorney, Agent, or Firm*—Bacon & Thomas

[57] ABSTRACT

A multiple function combined power system an internal combustion engine having a rotational output shaft that is coupled with an electrical machine through transmission gears, belts, or chains constituting a particular transmission device installed between the electrical machine, engine, and output shaft. The electrical machine is a series excited or auxiliary compound excited electrical machine with the electrical characteristic that its rotational speed increases with a decreasing load, or an AC or DC brush or brushless machine able to perform current control, including constant current control to provide a load-following value-added torque function, and is coupled with the engine output shaft through a particular transmission device operated in two system modes following the driving direction of the electrical machine, by means of a one-way clutch and an eccentric clutch in cooperation with control of the rotation directions of the electrical machine to cause (1) the electrical machine to start the engine, (2) the electrical machine to be used as a generator during engine operation, (3) the electrical machine and the engine to drive the load at the same time during the engine operation, (4) the electrical machine to drive the load, and (5) when the load is standing still, the engine to drive the electrical machine in a generator mode to charge the battery or other electrical loads.

12 Claims, 4 Drawing Sheets

MULTIPLE FUNCTIONED COMBINED POWER SYSTEM

BACKGROUND OF THE INVENTION

In recent years, energy and noise pollution problems have become more and more serious. A good solution to these problems would be to use the electrical power driven vehicles, but development of the electrical power driven vehicles has up to now been limited by the capacity of the batteries to achieve a larger moving range. Simply increasing the battery volume or quantity so as to increase the range will correspondingly increase the self-weight of the carrier, resulting in higher electrical consumption and does not meet economic requirements. Therefore, in the absence of a major breakthrough in solving the battery technical problems, a more practical driving method is to use combined driving structure designs. Current combined driving structure designs include:

(A) Series Combined Power Design: This design is the most typical structure for an electrically driven vehicle. In this design, the generator is driven by the engine to generate electricity and charge the battery, after which the battery provides electricity to the driven motor to drive the vehicle. As the energy is converted several times, the overall efficiency of this design is low. An example of this design is the GM HX3 vehicle of General Motors.

(B) Synchronized Power on Common Shaft Design: This design involves directly series combining the engine power output shaft and the rotating shaft of the driven motor, to thereby generate driving and speed controlling functions. An example of this design is West Germany's Volkswagen CHICO Sedan.

For the case of the conventional engine and motor described in (B), only one of the engine and motor can be selected for output transmission and the combination of their power output is not available.

SUMMARY OF THE INVENTION

This invention relates to a multiple function combined power system which is used in driving machinery such as vehicles, ships, flying machines or other mechanical structures, or other industrial or processing equipment, in rotational driving applications, and in which the rotational output shaft of an internal combustion engine is coupled with an electrical machine through transmission gears, belts, or chains which constitute a particular transmission device installed between the electrical machine, engine and the output shaft. The electrical machine is a series excited or auxiliary compound excited electrical machine with the electrical characteristic that its rotational speed increases with a decreasing load, or an AC or DC brush or brushless machine able to perform current control, including constant current control to provide a load-following value-added torque function, and is coupled with the engine output shaft through a particular transmission device operated in two system modes following the driving direction of the electrical machine, by means of a one-way clutch and an eccentric clutch in cooperation with control of the rotation directions of the electrical machine to cause (1) the electrical machine to start the engine, (2) the electrical machine to be used as a generator during engine operation, (3) the electrical machine and the engine to drive the load at the same time during the engine operation, (4) the electrical machine to drive the load, and (5) when the load is standing still, the engine to drive the electrical machine in a generator mode to charge the battery or other electrical loads.

DETAILED DESCRIPTION OF THE PREFERRED EMBODIMENTS

Figure 1:
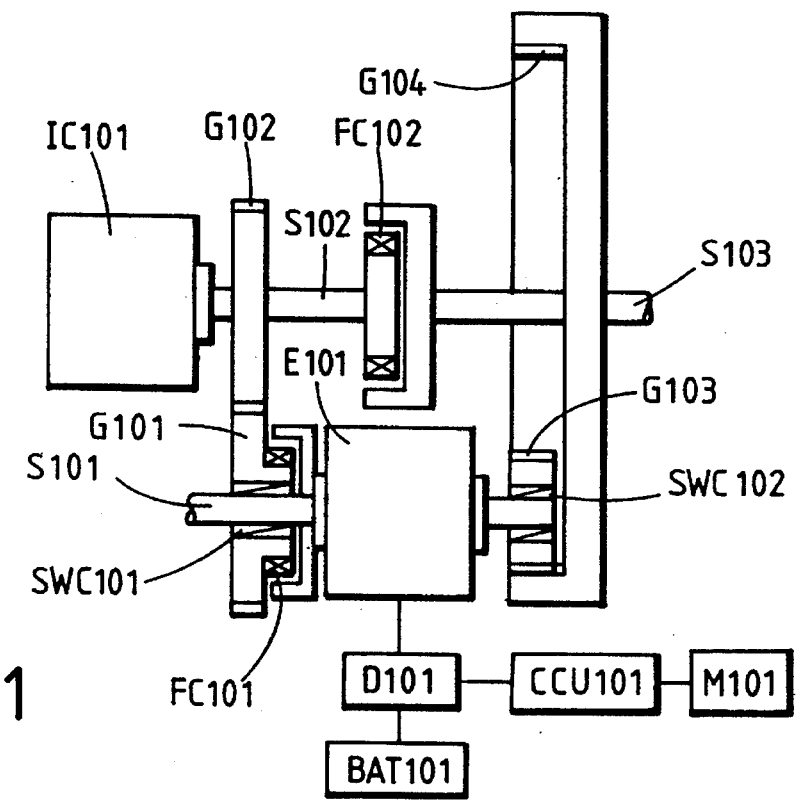
FIG. 1 is a side view of a first preferred embodiment invention.

Each of the embodiments of the invention shares the following structures:

An internal combustion engine IC101 driven by gasoline, diesel oil, refined oil, gas, or other fuel to drive a load or an electrical machine functioning as a generator;

An electrical machine E101 which may be a series excited or auxiliary compound excited electrical machine with the electrical characteristic that its rotational speed increases with a decreasing load, or an AC or DC brush or brushless electrical machine able to perform current control, including constant current control, and which may be operated through the manual control interface as a motor or generator;

One way transmission clutches SWC101, SWC102 made up of a device provided with a one way transmission function or ratchet wheel mechanism and coupled with the electrical machine rotating in positive or reverse directions to change the operating relationships between the system power components:

Eccentric clutches FC101, FC102 for transmitting power from the ends of rotating shafts and which are arranged to close and perform transmission above the rated speed while releasing and cutting off the transmission below the rated speed;

A manual control interface M101 made up of solid state or electromechanical components to allow manual input of relevant carrier operating commands to a central controller;

A central controller CCU101 including a microprocessor or solid state components, or electrocmechanical components, arranged to perform digital priority calculations on the manual control interface signals or the feedback signals and send the control commands to the drive controller;

A drive controller D101 made up of solid state or electromechanical components, and which receives the commands from the central controller to operate the electrical machine as a generator and control its power generation rate, or to operate the electrical machine as a motor and control its rotation direction and speed.

Through the above said components, the multiple function combined power systems of the preferred embodiments are provided with the following common characteristics:

(1) The electrical machine is operated by the drive controller D101 to function as a motor rotating in either positive or reverse directions, or to function as a generator for charging the battery or supplying power to other loads;

(2) The electrical machine is rotated in positive and reverse directions to provide the following system operations: The motor is rotated in the positive direction to start the engine IC101, and the engine is used to drive loads after it is started while the electrical machine is maintained in a waiting state;

(3) While the loads are driven by the engine, if the electrical machine is operated as a generator through the manual control interface M101, central controller CCU101, and the drive controller D101, then the engine drives the loads and the generator simultaneously to charge the battery or supply power to the other loads;

(4) While the loads are driven by the engine, if the electrical machine is operated as a motor, then the motor is powered by the battery and drives the loads together with the engine;

(5) If the electrical machine is operated as a motor and is rotated in the reverse direction, the transmission structure causes the rotation direction of the loads to be the same as if driven by the engine, and the loads are simply driven by the electrical machine operating as a motor while the engine is standing still;

(6) While the loads are driven by the engine, energy is recovered by operating the electrical machine as a generator to charge the battery or supply power to other loads, or by using the friction damping of the engine itself for a braking function;

(7) While the electrical machine is operated as a motor to drive the loads, energy recovery is achieved by using the electrical machine as a generator to charge the battery or supply power to other loads;

(8) To stop driving the loads and let the engine drive the electrical machine as an AC generator to charge the battery or supply power to other loads, the electrical machine E101 includes a permanent magnet or field winding excited, variable frequency driven field type electrical device, or a brushed alternator type electrical device having its armature winding commonly installed with the conducting rings for AC output and with the commutators for DC input/output. The AC output can be a variable frequency output or a constant frequency output through the engine constant speed control.

The various specific embodiments of the invention are now described as follows:

FIG. 1 shows the first preferred embodiment of the invention, including:

An internal combustion engine IC101 as described above,

An electrical machine E101 as described above wherein the rotation shaft S101 is installed with a one way transmission structure SWC101 and SWC102 at each end in the opposite direction, respectively, and is further combined with gears G101 and G103, the gear G101 being engaged with the gear G102 which is combined with the transmission shaft S102 of the engine IC101.

An eccentric clutch FC101 installed between the said gear G101 and the motor transmission shaft S101, wherein the clutch FC101 is responsive to the rotational speed to cause the friction disk to have its drive side combined with gear G101 and its driven side combined with the electrical machine transmission shaft S101;

The two ends of the eccentric clutches FC102 are respectively combined with the engine transmission shaft S102 and the output transmission shaft S103, with eccentric clutch FC102 being responsive to the rotational speed to cause the friction disk to have its drive side combined with the shaft S102 and its driven side combined with output transmission shaft S103;

The transmission shafts S101 and S103 are driven in the same direction through engagement between the pinion G103 and the internal gear G104. Alternatively, transmission can be achieved by adding a middle gear which engages the external gear, or by a chain wheel or belt wheel rotating in the same direction, to drive shafts S101 and S103 in the same rotation direction;

A manual control interface M101 as described above;

A central controller CCU101 as described above;

A drive controller D101 as described above and arranged to receive commands from the central controller CCU101 to operate the electrical machine E101 as a generator and to control its power generation rate to charge the battery BAT101 or supply power to other loads or as a motor and controlled as to rotation direction and rotational speeds.

Functions of this said embodiment are shown in Table 1, in which "CW" indicates clockwise rotation and "CCW" indicates counterclockwise rotation.

Figure 2:
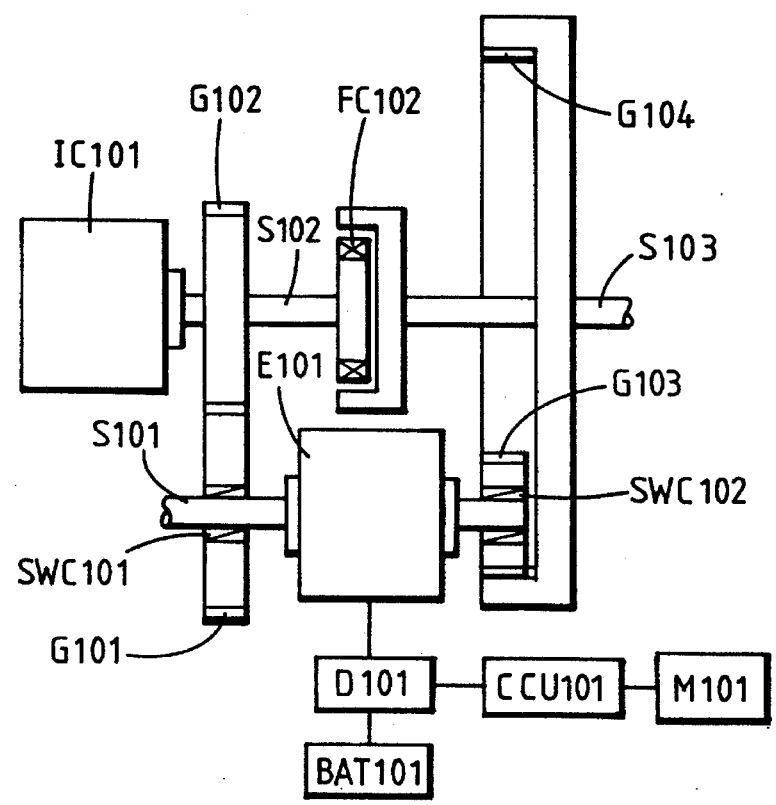
FIG. 2 is a side view of a second preferred embodiment of the invention.

FIG. 2 shows the second preferred embodiment of the multiple function combined power system of the invention, and includes the following elements:

an internal combustion engine IC101 as described above;

an electrical machine E101 as described above in connection with the embodiment of FIG. 1, but without eccentric clutch FC101.

Eccentric clutches FC102 as described above in connection with the embodiment of FIG. 1.

Transmission shafts S101 and S103 driven in the same direction through the pinion G103 engaging with the internal gear G104 as described above in connection with the embodiment of FIG. 1, or alternatively by means of a middle gear, belt, or chain as described above.

A manual control interface M101 as described above.

A central controller CCU101 as described above: It is the central processor comprised of the microprocessor or solid state components, or electromechanical components to perform digital priority calculations on the manual control interface signals or the feedback signals and send the control commands to the drive controller;

A drive controller D101 arranged as described above to receive commands from the central controller to operate the electrical machine as a motor and control its rotation directions and rotational speeds.

Functions of this embodiment are shown in Table 2.

Figure 3:
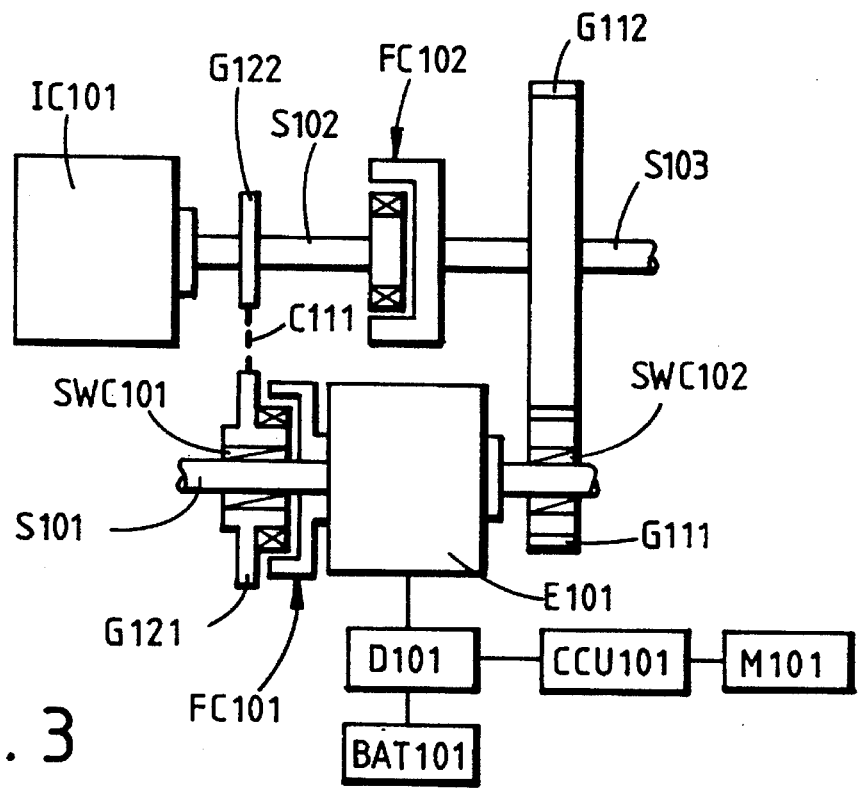
FIG. 3 is a side view of a third preferred embodiment of the invention.

FIG. 3 shows the third preferred embodiment of the multiple function combined power system of the invention which includes the following elements:

An internal combustion engine IC101 as described above;

An electrical machine E101 as described above, wherein the output shaft of the electrical machine is installed with one way transmission structures SWC101 and SWC102 at each end in different acting directions respectively, wherein the rotation shaft S101 drives the gear G111 through the one way transmission device SWC102 to engage with the gear G112 on the output transmission shaft to thereby drive the output shaft S103, and wherein the one way transmission structure SWC101 is coupled between the chain wheel G121 and the motor rotation shaft S101. In this embodiment, eccentric clutch FC101 is further installed between the chain wheel G121 and the motor rotation shaft S101, with the clutch FC101 being responsive to rotational speed to cause the friction disk to have its drive side combined with the chain wheel G121 and its driven side combined with the rotating shaft of the electrical machine. Another chain wheel G122 is combined with the engine transmission shaft S102 and is mutually driven with the said chain wheel G121 through the chain C111. Additional eccentric clutch FC102 is further installed between the engine transmission shaft S102 and the output shaft S103, with the said clutch FC102 also being responsive to the rotational speed to control a friction disk to have its drive side combined with the engine transmission shaft S102 and its driven side combined with output shaft S103;

A manual control interface M101 as described above;

A central controller CCU101 as described above;

A drive controller D101 as described above in connection with the embodiment of FIG. 1;

Functions of this preferred embodiment are shown in Table 3.

Figure 4:
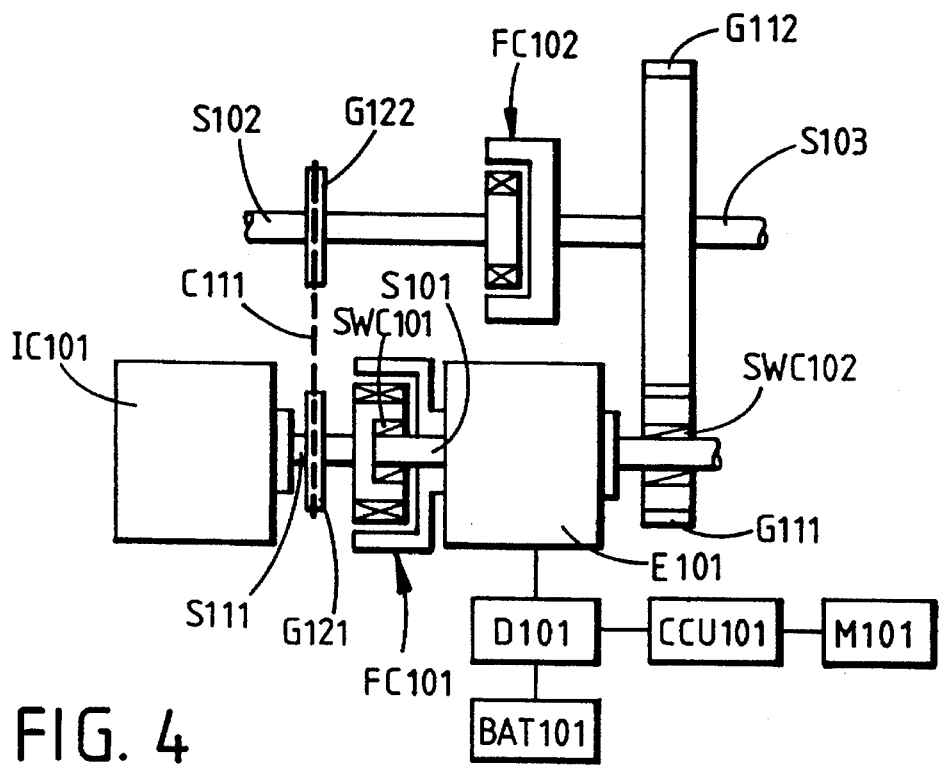
FIG. 4 is side view of a fourth preferred embodiment of the invention.

FIG. 4 shows the fourth preferred embodiment of the multiple function combined power system of the invention, including the following elements:

An internal combustion engine IC101 as described above;

An electrical machine E101 as described above, wherein the rotation shaft S101 drives a gear G111 in two different rotation directions through the one way transmission device SWC101 and is coupled with the drive side of eccentric clutch FC101 so as to be combined with the engine drive shaft S111 when the driven side of the clutch is combined with the electrical machine rotating shaft S101, the friction disk of the clutch FC101 on shaft S111 being arranged to engage shaft S101 above a predetermined rotational speed. A chain wheel G121 is installed on the engine rotating shaft S111 to engage with the chain wheel G122 which is installed on the auxiliary shaft S102. The second eccentric clutch FC102 is installed between the auxiliary shaft S102 and the output shaft S103, wherein the clutch FC102 is responsive to rotational speed to cause the friction disk to have its drive side combined with auxiliary shaft S102 and its driven side combined with output shaft S103. A gear G112 is further installed on the output shaft S103 to engage with gear G111, and a one way transmission structure SWC102 is installed between gear G111 and the transmission shaft of the electrical machine when its rotation direction is different than that of transmission structure SWC101;

A manual control interface M101 as described above;

A central controller CCU101 as described above;

A drive controller D101 as described above;

Functions of this said embodiment are shown in Table 4.

Figure 5:
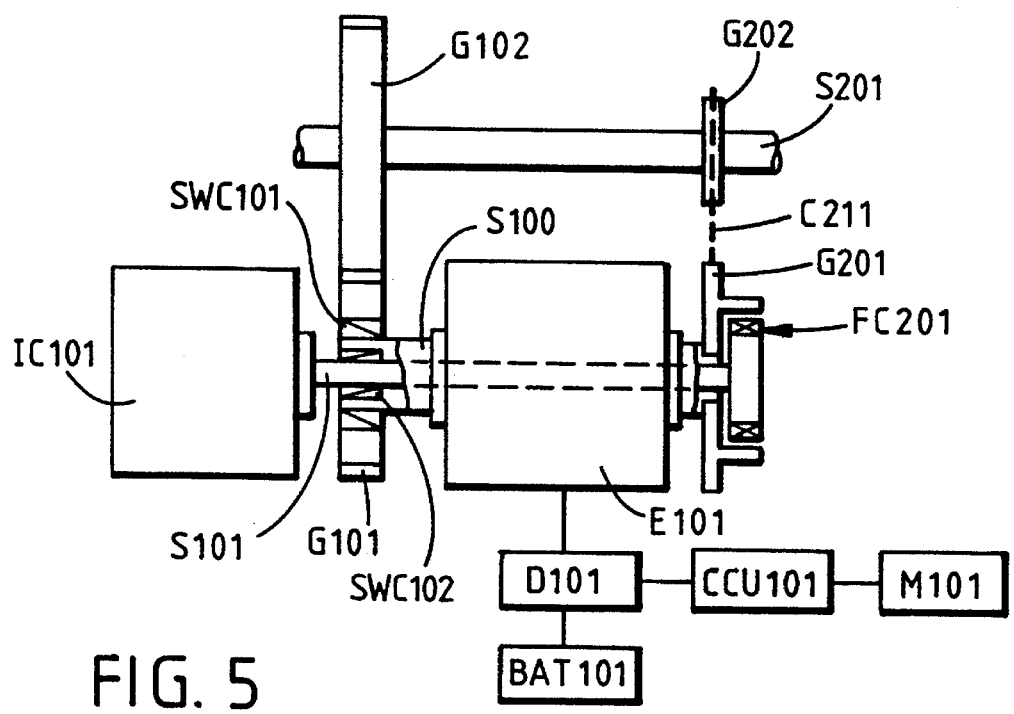
FIG. 5 is a side view of a fifth preferred embodiment of the invention.

FIG. 5 shows a fifth preferred embodiment of the multiple function combined power system of the invention, including the following elements:

An internal combustion engine IC101 as described above;

An electrical machine E101 as described above, wherein the rotation shaft S100 has a hollow pipe shape for enclosing a one way transmission device SWC102 which is combined with the engine rotating shaft S101, shaft S100 being in turn fitted into another one way transmission device SWC101 to combine with the transmission gear G101, gear G101 engaging gear G102. The two one-way transmission devices have different rotation directions, such that the engine rotating shaft is coupled with the above said chain G201 through the eccentric clutch FC201 when the FC201 responds to the rotational speed to cause the friction disk to have its drive side combined with the said engine rotating shaft S101 and its driven side combined with the said chain gear G201. The output shaft S201 is installed with a chain gear G202 to engage with the gear G201 through the chain C211 to provide power transmission, and is further installed with the gear G102 to engage with the gear G101;

A manual control interface M101 as described above;

A central controller CCU101 as described above;

A drive controller D101 as described above;

Functions of this embodiment example is shown in Table 5.

Figure 6:
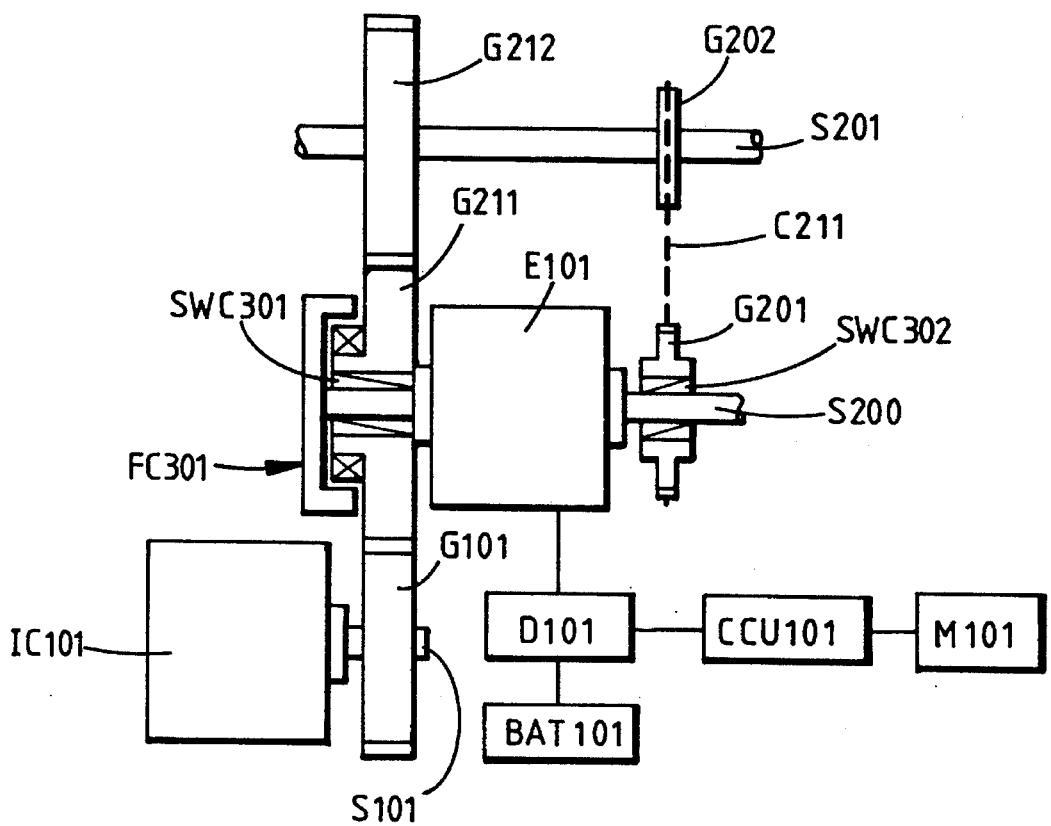
FIG. 6 is a side view of a sixth preferred embodiment of the invention.

FIG. 6 shows the sixth preferred embodiment of the multiple function combined power system of the invention, including the following elements:

An internal combustion engine IC101 as described above;

An electrical machine E101 as described above, wherein the electrical machine output shaft S200 is combined with the transmission chain wheel G201 through a one way transmission device SWC302 and is inserted into the one way transmission device SWC301 to drive the gear G211 in a single direction. The eccentric clutch FC301 is installed between the electrical machine output shaft S200 and the gear G211, with the clutch FC301 responding to the rotational speed to cause its friction disk to have its drive side combined with gear G211 and its driven side combined with electrical machine rotating shaft S200. The rotating shaft S101 of the engine IC101 is installed with gear G101 to engage gear G211, and the output shaft S201 is installed with gear G212 to engage with gear G211 and chain wheel G202 to couple with chain wheel G201 through the chain G211 for power transmission;

A manual control interface M101 as described above;

A central controller CCU101 as described above;

A drive controller D101 as described above;

Functions of this embodiment are shown in Table 6.

Figure 7:
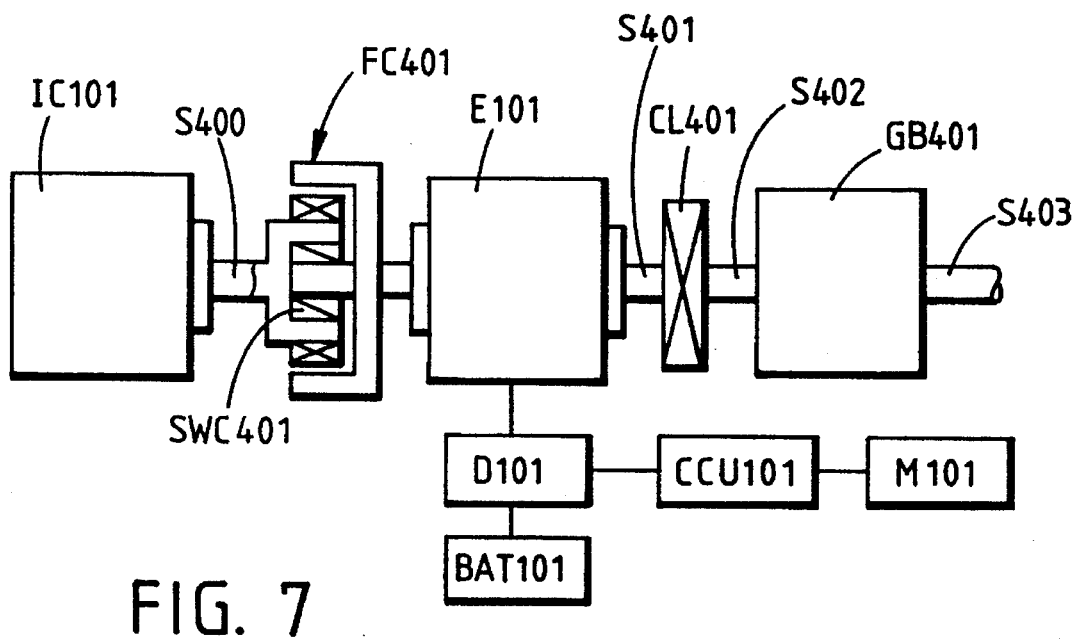
FIG. 7 is a side view of a seventh preferred embodiment of the invention.

FIG. 7 shows the seventh preferred embodiment of the multiple function combined power system of the invention, including the following elements:

An internal combustion engine IC101 as described above;

An electrical machine E101 as described above, wherein the rotation shaft S401 has a double ended structure, one end of the output clutch CL401 being combined with the output gear box GB401, while the other end is combined with one end of the electrical machine output shaft S401, and the loads are driven by the output shaft S403 of a gear box GB401. The other end of the electrical machine output shaft S401 is combined with the rotating shaft S400 of the engine IC101 through the one way transmission device SWC401, while the eccentric clutch FC401 is installed between the engine rotating shaft S400 and the electrical machine rotating shaft S401 and is responsive to the rotational speed to control the friction disk to have its drive side combined with engine rotating shaft S401. The gear box GB401 is designed to maintain the same rotation direction output whether or not the driving input shaft is in positive or reverse rotations;

A manual control interface M101 as described above;

A central controller CCU101 as described above; and

A drive controller D101 as described above;

Functions of this embodiment are shown in Table 7.

Figure 8:
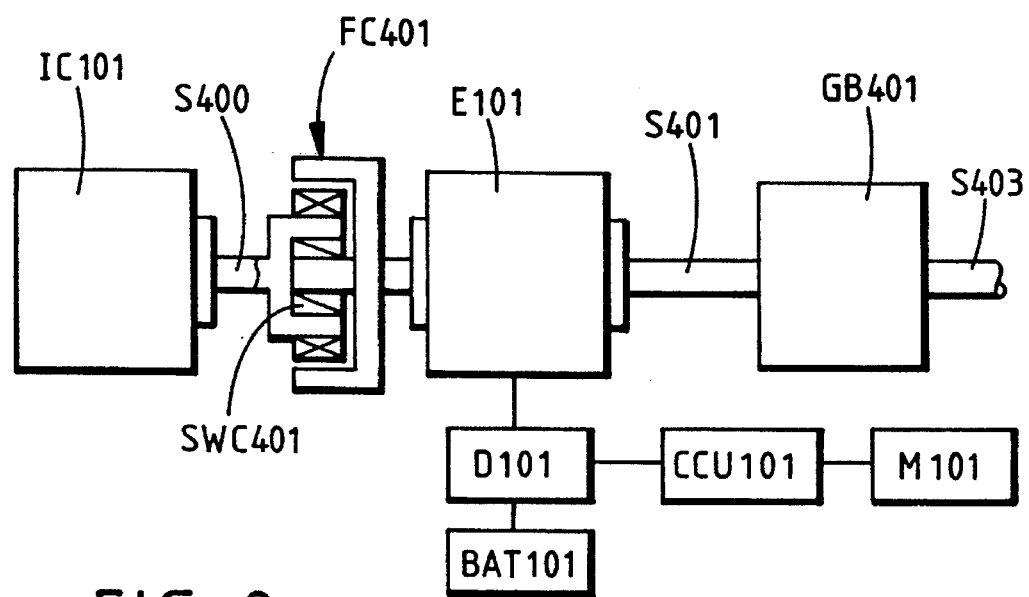
FIG. 8 is a side view of an eighth preferred embodiment of the invention.

FIG. 8 shows the eighth preferred embodiment of the multiple function combined power system of the invention, including the following elements:

An internal combustion engine IC101 as described above;

An electrical machine E101 as described above, wherein the rotation shaft S401 has a double-ended structure, one end of which is combined with output gear box GB401, and the loads are driven by the output shaft S403 of the said gear box GB401. The other end of the electrical machine output shaft S401 is combined with the rotating shaft S400 of the engine IC101 through the one way transmission device SWC401 while the eccentric clutch FC401 is installed between the engine rotating shaft S400 and the electrical machine rotating shaft S401 and is arranged to be responsive to the rotational speed to cause a friction disk to have its drive side combined with engine rotating shaft S400 and its driven side combined with electrical machine rotating shaft S401. The gear box GB401 is designed to maintain a same rotation direction output whether or not the driving input shaft is in positive or reverse rotations;

A manual control interface M101 as described above;

A central controller CCU101 as described above;

A drive controller D101 as described above;

Functions of this embodiment are shown in Table 8.

The transmission methods of same rotation direction at different shafts and the matched positions of the engine, the electrical machine or the one-way transmission components adopted in the above examples can be flexibly applied as follows without departing from the principles of the invention.

(1) Besides the cases mentioned in the above examples, the one-way transmission structure of the invention can be located at any shaft to provide fixed relative motions according to their transmission direction relationships;

(2) The engine driving interface can be located on shafts having fixed relative motion relationships in the transmission structure coupled with the engine rotating shaft;

(3) The electrical machine driving interface can be located on shafts having fixed relative motion relationships in the transmission structure coupled with the electrical machine rotating shaft, while the external output/input can be provided at one end or at two respective ends;

(4) The output eccentric clutch FC102 can be incorporated in different rotational speed relationships, for example by selecting it to have a higher closing and releasing rotation speed than the eccentric clutch FC101 installed between the electrical machine and the engine, so that the engine can be operated at low speed and the clutch maintained released while the battery is charged at standstill;

(5) The eccentric clutch for starting the engine can be selected to close at a rotation speed which is higher than the rotation speed of the motor during a no load condition when the motor is in the independent load driving function, to thereby prevent the motor from driving the engine during its load driving.

As summarized from the above descriptions, this design adopts a particular transmission structure coupled with the engine and the electrical machine, and thereby enables selection between having the motor start the engine or produce an independent driving output through the positive and reverse rotations of the electrical machine. For loads requiring only one-way driving, such as the motorcycles, the claimed structure is easy to operate is most practically effective for vehicles in the heavy stop and go traffic of cities.

TABLE 1

| M101/CCU101 | IC101 | E101 | D101 | BAT101 | G101 | G102 | G103 |
|---|---|---|---|---|---|---|---|
| STOP | STOP | STOP | OFF | Ready | Stop | STOP | STOP |
| START | CCW Start | Motor CW Operation | ON | discharge | CW | CCW | STOP |
| IC101 in operation and charging | O~Max CCW operation | CW Generation | ON | Charge | CW | CCW | CCW |
| IC101 in operation | O~Max CCW operation | No load operation | OFF | Ready | CW | CCW | CCW |
| Combined Power Driving | O~Max CCW operation | Motor CW operation | ON | Discharge | CW | CCW | CCW |
| Sliding Brake | Max→O | CW generation | ON | Charge | CW | CCW | CCW |
| Electric powered CCW | STOP | Motor low speed CCW operation | ON | Discharge | STOP | STOP | CCW |
| Charge in Stand-Still (Controllable Charge rate or timing stop) or generate varied frequency or constant frequency AC output | O~Max CCW operation | CW generation | On | Charge | CW | CCW | STOP |

| M101/CCU101 | G104 | FC101 | FC102 | SWC 101 | SWC 102 | S101 | S102 | S103 |
|---|---|---|---|---|---|---|---|---|
| STOP | STOP | OPEN | OPEN | OPEN | OPEN | STOP | STOP | STOP |
| START | STOP | CLOSE | OPEN | CLOSE | OPEN | CW | CCW | STOP |
| IC101 in operation and charging | CCW | CLOSE | CLOSE | OPEN | OPEN | CW | CCW | CCW |
| IC101 in operation | CCW | CLOSE | CLOSE | OPEN | OPEN | CW | CCW | CCW |
| Combined Power Driving | CCW | CLOSE OR OPEN | CLOSE | CLOSE | OPEN | CW | CCW | CCW |
| Sliding Brake | CCW | CLOSE | CLOSE | OPEN | OPEN | CW | CCW | CCW |
| Electric powered CCW | CCW | OPEN | OPEN | OPEN | CLOSE | CCW | STOP | CCW |

TABLE 1-continued

| | | | | | | | | |
|---|---|---|---|---|---|---|---|---|
| Charge in Stand-Still (Controllable Charge rate or timing stop) or generate varied frequency or constant frequency AC output | STOP | CLOSE | OPEN | OPEN | OPEN | CW | CCW | STOP |

Remark
For the case of AC power generation output functions, the E101 is selected to employee the electrical machine with AC power generating functions comprised of a permanent magnet or winding winding excited, varied frequency driven field type electrical device, or a brushed alternator type electrical device, wherein its armature winding is commonly installed the conducting rings for AC output and the commutators for DC input/output.

TABLE 2

| M101/CCU101 | IC101 | E101 | D101 | BAT101 | G101 | G102 | G103 |
|---|---|---|---|---|---|---|---|
| STOP | STOP | Stop | OFF | Ready | Stop | STOP | STOP |
| START | CCW Start | Motor CW Operation | ON | Discharge | CW | CCW | STOP |
| IC101 in operation | O~Max CCW operation | No load | OFF | Ready | CW | CCW | CCW |
| Combined Power Driving | O~Max CCW operation | Motor CW operation | ON | Discharge | CW | CCW | CCW |
| Electric powered CCW | STOP | Motor low speed CCW operation | ON | Discharge | CCW | CW | CCW |

| M101/CCU101 | G104 | FC102 | SWC 101 | SWC 102 | S101 | S102 | S103 |
|---|---|---|---|---|---|---|---|
| STOP | STOP | OPEN | OPEN | OPEN | STOP | STOP | STOP |
| START | STOP | OPEN | CLOSE | OPEN | CW | CCW | STOP |
| IC101 in operation | CCW | CLOSE | OPEN | OPEN | CW | CCW | CCW |
| Combined Power Driving | CCW | CLOSE | CLOSE | OPEN | CW | CCW | CCW |
| Electric powered CCW | CCW | OPEN | OPEN | CLOSE | CCW | STOP | CCW |

TABLE 3

| M101/CCU101 | IC101 | E101 | D101 | BAT101 | G121 | G122 | G111 | G112 |
|---|---|---|---|---|---|---|---|---|
| STOP | STOP | STOP | OFF | Ready | Stop | STOP | STOP | STOP |
| START | CW Start | Motor CW Operation | ON | Discharge | CW | CW | CCW | CW |
| IC101 in operation and charging | O~Max CW operation | CW Generation | ON | Charge | CW | CW | CCW | CW |
| IC101 in operation | O~Max CW operation | No load operation | OFF | Ready | CW | CW | CCW | CW |
| Combined Power Driving | O~Max CW operation | Motor CW operation | ON | Discharge | CW | CW | CCW | CW |
| Sliding Brake | Max→O | CW generation | ON | Charge | CW | CW | CCW | CW |
| Electric powered CCW | STOP | Motor low speed CCW operation | ON | Discharge | CW | STOP | CCW | CCW |
| Charge in Stand-Still (Controllable Charge rate or timing stop) or generate varied frequency or constant frequency AC output | O~Max CW operation | CW generation | On | Charge | CW | CW | CW OR OPEN | CW OR STOP |

| M101/CCU101 | FC101 | FC102 | SWC 101 | SWC 102 | S101 | S102 | S103 |
|---|---|---|---|---|---|---|---|
| START | CLOSE | CLOSE | CLOSE | OPEN | CW | CW | CW |

TABLE 3-continued

| | | | | | | | |
|---|---|---|---|---|---|---|---|
| IC101 in operation and charging | CLOSE | CLOSE | OPEN | OPEN | CW | CW | CW |
| IC101 in operation | CLOSE | CLOSE | OPEN | OPEN | CW | CW | CW |
| Combined Power Driving | CLOSE | CLOSE | CLOSE | OPEN | CW | CW | CW |
| Sliding Brake | OPEN | CLOSE | OPEN | OPEN | CW | CW | CW |
| Electric powered CCW | OPEN | OPEN | OPEN | CLOSE | CW | STOP | CCW |
| Charge in Stand-Still (Controllable Charge rate or timing stop) or generate varied frequency or constant frequency AC output | CLOSE | CLOSE OR OPEN | OPEN | OPEN | CW | CW | CW OR STOP |

Remark
For the case of AC power generation output functions, the E101 is selected to employ the electrical machine with AC power generating functions comprised of a permanent magnet or winding winding excited, varied frequency driven field type electrical device, or a brushed alternator type electrical device, wherein its armature winding is commonly installed the conducting rings for AC output and the commutators fo DC input/output.

TABLE 4

| M101/CCU101 | IC101 | E101 | D101 | BAT101 | G111 | G112 | G121 G122 |
|---|---|---|---|---|---|---|---|
| STOP | STOP | STOP | OFF | Ready | STOP | STOP | STOP |
| START | CW Start | Motor CW Operation | ON | Discharge | CCW | CW | STOP |
| IC101 in operation and charging | O~Max CW operation | CW Generation | ON | Charge | CCW | CW | CW |
| IC101 in operation | O~Max CW operation | No load operation | OFF | Ready | CCW | CW | CW |
| Combined Power Driving | O~Max CW operation | Motor CW operation | ON | Discharge | CCW | CW | CW |
| Sliding Brake | Max→O | CW generation | ON | Charge | CCW | CW | CW |
| Electric powered CCW | STOP | Motor low speed CCW operation | ON | Discharge | CCW | CW | STOP |
| Charge in Stand-Still (Controllable Charge rate or timing stop) or generate varied frequency or constant frequency AC output | O~Max CW operation | CW generation | On | Charge | CCW OR STOP | CW OR STOP | CW |

| M101/CCU101 | FC101 | FC102 | SWC 101 | SWC 102 | S101 | S102 S111 | S103 |
|---|---|---|---|---|---|---|---|
| STOP | OPEN | OPEN | OPEN | OPEN | STOP | STOP | STOP |
| START | CLOSE | CLOSE | CLOSE | OPEN | CW | CW | CW |
| IC101 in operation and charging | CLOSE | CLOSE | OPEN | OPEN | CW | CW | CW |
| IC101 in operation | CLOSE | CLOSE | OPEN | OPEN | CW | CW | CW |
| Combined Power Driving | CLOSE | CLOSE | CLOSE | OPEN | CW | CW | CW |
| Sliding Brake | CLOSE OR OPEN | CLOSE OPEN | OPEN | OPEN | CW | CW | CW |
| Electric powered CCW | OPEN | OPEN | OPEN | CLOSE | CCW | STOP | CCW |
| Charge in Stand-Still (Controllable Charge rate or timing stop) or generate varied frequency or constant frequency AC output | CLOSE | CLOSE OR OPEN | OPEN | OPEN | CW | CW | CW OR STOP |

Remark
For the case of AC power generation output functions, the E101 is selected to employee the electrical machine with AC power generating functions comprised of a permanent magnet or winding winding excited, varied frequency driven field type electrical device, or a brushed alternator type electrical device, wherein its armature winding is commonly installed the conducting rings for AC output and the commutators fo DC input/output.

TABLE 5

| M101/CCU101 | IC101 | E101 | D101 | BAT101 | G101 | G102 | G201 |
|---|---|---|---|---|---|---|---|
| STOP | STOP | Stop | OFF | Ready | STOP | STOP | STOP |
| START | CW Start | Motor CW Operation | ON | Discharge | CCW | CW | CW |
| IC101 in operation and charging | 0~Max CW operation | CW Generation | ON | Charge | CCW | CW | CW |
| IC101 in operation | 0~Max CW operation | No load operation | OFF | Ready | CCW | CW | CW |
| Combined Power Driving | 0~Max CW operation | Motor CW operation | ON | Discharge | CCW | CW | CW |
| Sliding Brake | Max→0 | CW generation | ON | Charge | CCW | CW | CW |
| Electric powered CCW | STOP | Motor low speed CCW operation | ON | Discharge | CCW | CW | CW |
| Charge in Stand-Still (Controllable Charge rate or timing stop) or generate varied frequency or constant frequency AC output | 0~Max CW operation | CW generation | On | Charge | CCW | CW | CW |

| M101/CCU101 | G202 | FC201 | SWC 101 | SWC 102 | S100 | S101 | S201 |
|---|---|---|---|---|---|---|---|
| STOP | STOP | OPEN | OPEN | OPEN | STOP | STOP | STOP |
| START | CW | CLOSE | OPEN | CLOSE | CW | CW | CW |
| IC101 in operation and charging | CW | CLOSE | OPEN | CLOSE | CW | CW | CW |
| IC101 | CW | CLOSE | OPEN | CLOSE | CW | CW | CW |
| Combined Power Driving | CW | CLOSE | OPEN | CLOSE | CW | CW | CW |
| Sliding Brake | CW | CLOSE | OPEN | CLOSE | CW | CW | CW |
| Electric powered CCW | CW | OPEN | CLOSE | OPEN | CCW | STOP | CCW |
| Charge in Stand-Still (Controllable Charge rate or timing) or generate varied frequency or constant frequency AC output | CW | CLOSE | OPEN | CLOSE | CW | CW | CW |

Remark
For the case of AC power generation output functions, the E101 is selected to employee the electrical machine with AC power generating functions comprised of a permanent magnet or winding winding excited, varied frequency driven field type electrical device, or a brushed alternator type electrical device, wherein its armature winding is commonly installed the conducting rings for AC output and the commutators fo DC input/output.

TABLE 6

| M101/CCU101 | IC101 | E101 | D101 | BAT101 | G101 | G201 | G202 | G211 |
|---|---|---|---|---|---|---|---|---|
| STOP | STOP | STOP | OFF | Ready | STOP | STOP | STOP | STOP |
| START | CCW Start | Motor CW Operation | ON | Discharge | CCW | CCW | CCW | CW |
| IC101 in operation and charging | 0~Max CCW operation | CW Generation | ON | Charge | CCW | CCW | CCW | CW |
| IC101 in operation | 0~Max CCW operation | No load operation | OFF | Ready | CCW | CCW | CCW | CW |
| Combined Power Driving | 0~Max CCW operation | Motor CW operation | ON | Discharge | CCW | CCW | CCW | CW |
| Sliding Brake | Max→0 | CW generation | ON | Charge | CCW | CCW | CCW | CW |
| Electric powered CCW | STOP | Motor low speed CCW operation | ON | Discharge | CCW | CCW | CCW | CW |
| Charge in Stand-Still (Controllable Charge rate or timing stop) | 0~Max CCW operation | CW generation | ON | Charge | CCW | CCW | CCW | CW |

SWC SWC

TABLE 6-continued

| M101/CCU101 | G212 | FC301 | 301 | 302 | S200 | S201 | S101 |
|---|---|---|---|---|---|---|---|
| STOP | STOP | OPEN | OPEN | OPEN | STOP | STOP | STOP |
| START | CCW | CLOSE | CLOSE | OPEN | CW | CCW | CCW |
| IC101 in operation and charging | CCW | CLOSE | OPEN | OPEN | CW | CCW | CCW |
| IC101 in operation | CCW | CLOSE | OPEN | OPEN | CW | CCW | CCW |
| Combined Power Driving | CCW | CLOSE | CLOSE | OPEN | CW | CCW | CCW |
| Sliding Brake | CCW | CLOSE | OPEN | OPEN | CW | CCW | CCW |
| Electric powered CCW | CCW | OPEN | OPEN | CLOSE | CCW | CCW | CCW |
| Charge in Stand-Still (Controllable Charge rate or timing stop) | CCW | CLOSE | OPEN | OPEN | CW | CCW | CCW |

TABLE 7

| M101/CCU101 | IC101 | E101 | D101 | BAT101 | FC401 | SWC 401 | CL401 | S400 | S401 | S402 | S403 |
|---|---|---|---|---|---|---|---|---|---|---|---|
| STOP | STOP | STOP | OFF | Ready | OPEN | OPEN | STOP | STOP | STOP | STOP | STOP |
| START | CW Start | Motor CW | ON | Discharge | CLOSE | CLOSE | OPEN | CW | CW | CW | CW |
| IC101 in operation and charging | O~Max CW operation | CW Generation | ON | Charge | CLOSE | CLOSE | CLOSE | CW | CW | CW | CW |
| IC101 in operation | O~Max CW operation | No load operation | OFF | Ready | CLOSE | CLOSE | CLOSE | CW | CW | CW | CW |
| Combined Power Driving | O~Max CW operation | Motor CW operation | ON | Discharge | CLOSE | CLOSE | CLOSE | CW | CW | CW | CW |
| Sliding Brake | Max→O | CW generation | ON | Charge | CLOSE | CLOSE | CLOSE | CW | CW | CW | CW |
| Electric powered CCW | STOP | Motor low speed CCW operation | ON | Discharge | OPEN | OPEN | CLOSE | STOP | CCW | CCW | CW |
| Charge in Stand-Still (Controllable Charge rate or timing stop) | O~Max CW operation | CW generation | ON | Charge | CLOSE | CLOSE | OPEN | CW | CW | STOP | STOP |

TABLE 8

| M101/CCU101 | IC101 | E101 | D101 | BAT101 | FC401 | SWC 401 | S400 | S401 | S403 |
|---|---|---|---|---|---|---|---|---|---|
| STOP | STOP | STOP | OFF | Ready | OPEN | OPEN | STOP | STOP | STOP |
| START | CW Start | Motor CW Operation | ON | Discharge | CLOSE | CLOSE | CW | CW | CW |
| IC101 in operation and charging | O~Max CW operation | CW Generation | ON | Charge | CLOSE | CLOSE | CW | CW | CW |
| IC101 in operation | O~Max CW operation | No load operation | OFF | Ready | CLOSE | CLOSE | CW | CW | CW |
| Combined Power Driving | O~Max CW operation | Motor CW operation | ON | Discharge | CLOSE | CLOSE | CW | CW | CW |
| Sliding Brake | Max→O | CW generation | ON | Charge | CLOSE | CLOSE | CW | CW | CW |
| Electric powered CCW | STOP | Motor low speed CCW operation | ON | Discharge | OPEN | OPEN | STOP | CCW | CW |
| Charge in Stand-Still (Controllable Charge rate or timing stop) | O~Max CW operation | CW generation | ON | Charge | CLOSE | CLOSE | CW | CW | CW |

I claim:

1. A multiple function combined power system, comprising:

an internal combustion engine;

an electrical machine arranged to be operated through a manual control interface as a motor and generator;

first and second one way transmission devices coupled with the electrical machine;

at least one of first and second speed responsive clutches connected to transmit power from ends of rotating shafts and arranged to engage and perform transmission above rated speed while releasing and cutting off the transmission below the rated speed;

a manual control interface arranged to allow manual input of relevant carrier operating commands;

a central controller arranged to perform digital priority calculations on signals from the manual control interface signals or on feedback signals, generate control commands;

a drive controller arranged to receive the control commands from the central controller to operate the electrical machine as a generator and control its power generation rate, and to operate the electrical machine as a motor and control its rotation direction and speed, wherein the manual control interface, central control unit, and drive controller include means for carrying out the following functions:

(1) the electrical machine is operated by the drive controller to function as a motor rotating in either positive or reverse directions, or to function as a generator for charging the battery or supplying power to other loads;

(2) the electrical machine is rotated in positive and reverse directions to provide the following system operations: the motor is rotated in the positive direction to start the engine, and the engine is used to drive loads after it is started while the electrical machine is maintained in a waiting state;

(3) while the loads are driven by the engine, if the electrical machine is operated as a generator through the manual control interface, the central controller, and the drive controller, then the engine drives the loads and the generator simultaneously to charge the battery or supply power to the other loads;

(4) while the loads are driven by the engine, if the electrical machine is operated as a motor, then the motor is powered by the battery and drives the loads together with the engine;

(5) if the electrical machine is operated as a motor and is rotated in the reverse direction, the transmission structure causes the rotation direction of the loads to be the same as if driven by the engine, and the loads are simply driven by the electrical machine operating as a motor while the engine is standing still;

(6) while the loads are driven by the engine, energy is recovered by operating the electrical machine as a generator to charge the battery or supply power to other loads, or by using the friction damping of the engine itself for a braking function;

(7) while the electrical machine is operated as a motor to drive the loads, energy recovery is achieved by using the electrical machine as a generator to charge the battery or supply power to other loads;

(8) the electrical machine is driven by the engine as an AC generator to charge the battery or supply power to other loads.

2. A combined power system as claimed in claim 1, wherein:

the electrical machine includes an electrical machine transmission shaft installed with said one way transmission structures at each end, the one way transmission structures being arranged to rotate in opposite directions, the electrical machine further includes first, second, and third gears, the first gear being engaged with the second gear which is combined with a transmission shaft of the engine, the first speed responsive clutch is installed between the first gear and the motor transmission shaft and includes a friction disk having a drive side arranged to engage the first gear and a driven side arranged to engage an electrical machine transmission shaft when the rated speed is exceeded, the second speed responsive clutch includes a friction disk having a drive side combined with the engine transmission shaft and a driven side combined with an output transmission shaft, and the system further includes means for driving the engine transmission shaft and the output transmission shaft in the same rotation direction.

3. A combined power system as claimed in claim 1, wherein:

the electrical machine includes an electrical machine transmission shaft installed with said one way transmission structures at each end, the one way transmission structures being arranged to rotate in opposite directions, the electrical machine further includes first, second, and third gears, the first gear being engaged with the second gear which is combined with a transmission shaft of the engine, the second speed responsive clutch includes a friction disk having a drive side combined with the engine transmission shaft and a driven side combined with an output transmission shaft, and the system further includes means for driving the engine transmission shaft and the output transmission shaft in the same rotation direction.

4. A combined power system as claimed in claim 1, wherein:

an output shaft of the electrical machine is installed with said one way transmission devices at each end, said one way transmission devices being arranged to act in different directions, the output shaft of the electrical machine drives a gear through the second one way transmission device to engage with a gear on the output transmission shaft to thereby drive an output transmission shaft, the first one way transmission structure is coupled between a chain wheel and the output shaft of the electrical machine, the first speed responsive clutch is installed between the chain wheel and the engine transmission shaft, and includes a friction disk having a drive side combined with the chain wheel and a driven side combined with the output shaft of the electrical machine, a second chain wheel is combined with the engine transmission shaft and is mutually driven with the first chain wheel through a chain, and the second speed responsive clutch is further installed between the engine transmission shaft and a transmission output shaft, and the second speed responsive clutch includes a friction disk having a drive side combined with the engine transmission shaft and a driven side combined with the transmission output shaft.

5. A combined power system as claimed in claim 1, wherein:

the electrical machine includes a rotating shaft arranged to drive a first gear in two different rotation directions through the first one way transmission device and which is coupled with a drive side of the first speed responsive clutch so as to be combined with an engine drive shaft when a driven side of the first speed responsive clutch is combined with the electrical machine rotating shaft, the first eccentric clutch having a friction disk on the engine drive shaft which is arranged to engage with a second chain wheel installed on the engine transmission shaft, the second speed responsive clutch is installed between the engine transmission shaft and a transmission output shaft and has a friction disk having a drive side combined with the engine transmission shaft and a driven side combined with the transmission output shaft, a second gear is installed on the transmission output shaft to engage the first gear, and the second one way transmission device is installed between the first gear and the rotating shaft of the electrical machine when its rotation direction is different than that of the first transmission device.

6. A combined power system as claimed in claim 1, wherein:

the electrical machine includes a hollow pipe-shaped rotating shaft arranged to enclose the second one way transmission device, the second one way transmission device being combined with the engine transmission shaft, said rotating shaft being in turn fitted into the first one way transmission device and combined with a first transmission gear, the first transmission gear engaging a second transmission gear, the first and second one way transmission devices being arranged to have different rotating directions, the engine transmission shaft is coupled with a chain gear through the second speed responsive clutch when a drive side of a friction disk engages the engine transmission shaft and a driven side of the friction disk engages the chain gear, an output shaft is installed with a second chain gear which engages the second transmission gear through a second chain gear connected to the first chain gear by a chain, and the output shaft is further installed with the second transmission gear to transmit power to the first transmission gear.

7. A combined power system as claimed in claim 1, wherein:

the electrical machine includes an output shaft combined with a transmission chain wheel through the second one way transmission device and is inserted into the first one way transmission device to drive a first gear in a single direction, the first speed responsive clutch is installed between the output shaft and the first gear and includes a friction disk having a drive side combined with the first gear and a driven side combined with the rotating shaft, and the engine transmission shaft is installed with a second gear to engage the first gear, and the a second output shaft is installed with a third gear to engage the first gear and a second chain wheel to couple with the first chain wheel through a chain.

8. A combined power system as claimed in claim 1, wherein:

the electrical machine includes a rotating shaft having first and second ends, a first end of a first speed responsive clutch is combined with an output gear box and a second of the first speed responsive clutch is combined with the first end of the electrical machine rotating shaft, the loads are driven by an output shaft of the gearbox, the second end of the electrical machine rotating shaft is combined with an engine rotating shaft through the first one way transmission device, the second speed responsive clutch is installed between the engine rotating shaft and the electrical machine rotating shaft and includes a friction disk having a drive side combined with the engine rotating shaft, and the gear box is arranged to maintain the same rotations direction whether or not a driving input shaft in positive or reverse rotation.

9. A combined power system as claimed in claim 1, wherein:

the electrical machine includes a rotating shaft having first and second ends, the first end of the electrical machine rotating shaft being combined with an output gear box, the load are driven by an output shaft of the gearbox, the second end of the electrical machine rotating shaft is combined with a rotating shaft of the engine through the first one way transmission device, the speed responsive clutch is installed between the engine rotating shaft and includes a friction disk having a drive side combined with the engine rotating shaft and a driven side combined with the electrical machine rotating shaft, and the gearbox is arranged to maintain a same rotation direction whether or not a driving input shaft is in positive or reverse rotation.

10. A combined power system as claimed in claim 1, wherein the first speed responsive clutch is installed between the electrical machine and the engine and the second speed responsive clutch and the second speed responsive clutch is installed between the electrical machine and a load, and wherein the second speed responsive clutch has a higher rated speed than the first speed responsive clutch so that the engine can be operated at low speed while the second speed responsive clutch is maintained in a released condition to enable a battery to be charged by the electrical machine while the system is standing still.

11. A combined power system as claimed in claim 10, wherein the rated speed of the first speed responsive clutch is higher than a rotation speed of the electrical machine at no load condition when the electrical machine is in an independent load driving function to prevent the electrical machine from driving the engine during its load driving.

12. A combined power system as claimed in claim 1, wherein at least one of the one way transmission devices is ratchet wheel mechanism.

\* \* \* \* \*